United States Patent
Wang et al.

(10) Patent No.: US 11,987,025 B2
(45) Date of Patent: May 21, 2024

(54) THERMOPLASTIC ROOFING MEMBRANES FOR FULLY-ADHERED ROOFING SYSTEMS

(71) Applicant: Firestone Building Products Company, LLC, Nashville, TN (US)

(72) Inventors: Hao Wang, Carmel, IN (US); Donna C. Tippmann, Fishers, IN (US)

(73) Assignee: Holcim Technology Ltd, Zug (CH)

( * ) Notice: Subject to any disclaimer, the term of this patent is extended or adjusted under 35 U.S.C. 154(b) by 332 days.

(21) Appl. No.: 17/429,396

(22) PCT Filed: Feb. 10, 2020

(86) PCT No.: PCT/US2020/017410
§ 371 (c)(1),
(2) Date: Aug. 9, 2021

(87) PCT Pub. No.: WO2020/163844
PCT Pub. Date: Aug. 13, 2020

(65) Prior Publication Data
US 2022/0143962 A1    May 12, 2022

Related U.S. Application Data

(60) Provisional application No. 62/803,551, filed on Feb. 10, 2019.

(51) Int. Cl.
*B32B 27/32* (2006.01)
*B32B 5/02* (2006.01)
(Continued)

(52) U.S. Cl.
CPC ............... *B32B 27/32* (2013.01); *B32B 5/028* (2013.01); *B32B 7/027* (2019.01); *B32B 27/08* (2013.01);
(Continued)

(58) Field of Classification Search
CPC ........................... B32B 2419/06; E04D 11/02
See application file for complete search history.

(56) References Cited

U.S. PATENT DOCUMENTS

| | | | |
|---|---|---|---|
| 11,428,008 B2 * | 8/2022 | Yang | ........................ B32B 25/12 |
| 2006/0199908 A1 * | 9/2006 | Cheung | ............... C08L 23/0815 |
| | | | 525/191 |

(Continued)

FOREIGN PATENT DOCUMENTS

JP    3599862 B2    6/1997

OTHER PUBLICATIONS

International Search Report and Written Opinion dated Jun. 4, 2020 for corresponding International Application PCT/US2020/017410 (12 pp).
(Continued)

*Primary Examiner* — Brent W Herring
(74) *Attorney, Agent, or Firm* — Kenner Renner; Arthur M. Reginelli

(57) ABSTRACT

A thermoplastic roofing membrane comprising a planar-shaped thermoplastic body, said planar body having opposed first and second external planar surfaces, where said first surface includes an ethylene-based olefinic block copolymer and a fatty acid amide, where the amount of fatty acid amide provides the surface with a coefficient of friction (ASTM D 1894) of less than 0.250.

14 Claims, 4 Drawing Sheets

(51) Int. Cl.
  *B32B 7/027* (2019.01)
  *B32B 27/08* (2006.01)
  *B32B 27/12* (2006.01)
  *B32B 27/20* (2006.01)
  *B32B 27/34* (2006.01)
  *E04D 5/10* (2006.01)
  *E04D 5/14* (2006.01)
  *E04D 11/02* (2006.01)

(52) U.S. Cl.
  CPC ............ *B32B 27/12* (2013.01); *B32B 27/20* (2013.01); *B32B 27/34* (2013.01); *E04D 5/10* (2013.01); *B32B 2264/108* (2013.01); *B32B 2270/00* (2013.01); *B32B 2307/3065* (2013.01); *B32B 2307/546* (2013.01); *B32B 2419/06* (2013.01); *E04D 5/148* (2013.01); *E04D 11/02* (2013.01)

(56) References Cited

U.S. PATENT DOCUMENTS

| | | | |
|---|---|---|---|
| 2009/0255573 A1 | 10/2009 | Taylor | |
| 2010/0029827 A1* | 2/2010 | Ansems | C08L 51/06 524/505 |
| 2010/0125114 A1 | 5/2010 | Williams et al. | |
| 2010/0316820 A1* | 12/2010 | Kolb | B29C 48/151 156/244.11 |
| 2011/0024951 A1* | 2/2011 | Kolb | B32B 27/18 264/512 |
| 2012/0053284 A1* | 3/2012 | Knoll | C08L 25/12 524/502 |
| 2012/0096791 A1* | 4/2012 | Cashin | B32B 27/12 52/409 |
| 2013/0252005 A1 | 9/2013 | Savargaokar et al. | |
| 2014/0302295 A1 | 10/2014 | Thies et al. | |
| 2015/0038629 A1 | 2/2015 | Ultsch | |
| 2015/0314511 A1 | 11/2015 | Stoiljkovic et al. | |
| 2015/0316356 A1* | 11/2015 | Saucedo | B29C 70/44 425/389 |
| 2016/0115291 A1* | 4/2016 | Topolkaraev | B32B 5/022 428/221 |
| 2017/0284773 A9* | 10/2017 | Saucedo | B32B 18/00 |
| 2018/0023301 A1 | 1/2018 | Wang et al. | |
| 2018/0094439 A1 | 4/2018 | Wang et al. | |
| 2018/0162109 A1 | 6/2018 | Gopalan et al. | |
| 2018/0162971 A1 | 6/2018 | Chen et al. | |
| 2021/0198465 A1* | 7/2021 | Gopalan | C08F 8/12 |
| 2022/0098866 A1* | 3/2022 | Yang | B32B 25/12 |

OTHER PUBLICATIONS

Technical Information-Slip Agent Masterbatch; by SA Tech SamA C&I Co., Ltd (2 pp).

* cited by examiner

THERMOPLASTIC ROOFING MEMBRANES FOR FULLY-ADHERED ROOFING SYSTEMS

FIELD OF THE INVENTION

Embodiments of the present invention provide thermoplastic roofing membranes that are useful for fully-adhered roofing systems. In one or more embodiments, the top layer of the membranes includes an ethylene-based olefinic block copolymer and threshold levels of fatty acid amides.

BACKGROUND OF THE INVENTION

Thermoplastic roofing membranes, especially those membranes engineered to cover flat or low-sloped roofs, are known in the art. Many of these membranes are engineered to meet the industry standards defined in ASTM D790. Among the performance requirements provided in this industry standard, thermoplastic roofing membranes must meet threshold requirements for tensile strength and tear strength. Tensile strength is an indicator of seam strength, and the seam strength must withstand wind uplift forces. Tear strength is primarily important from the standpoint of fastener pull through. That is, where the membrane is mechanically attached to the roof surface, the membrane must be able to withstand threshold wind uplift forces without tear at the location of the fastener.

Many commercially-available thermoplastic roofing membranes include fabric-reinforced thermoplastic sheets. These membranes are fabricated by sandwiching a reinforcing fabric between two extruded thermoplastic sheets to provide a laminated structure. The thermoplastic extruded sheets, which can be the same or different, often include ethylene-propylene reactor copolymers (e.g., CA10A available from Lyondellbasell), together with various additives, such as inert filler, anti-weathering additives, and flame retardants. As the skilled person appreciates, the type and amount of additives employed, such as the filler, can impact the mechanical properties of the membrane including tensile and tear strength.

While industry standards for thermoplastic roofing membranes are designed with an eye toward mechanically-attached thermoplastic roofing systems, fully-adhered systems also exist. In fact, fully-adhered systems are often viewed as superior roof systems. As the skilled person appreciates, a fully-adhered system is installed by using an adhesive that attaches the membrane to the roof surface, where the adhesive substantially contacts the entire membrane surface adjacent to the roof deck. In practice, liquid bond adhesives or pressure-sensitive adhesives that are factory applied to the membrane are often used.

As suggested above, ethylene-propylene reactor copolymers have historically been employed in the manufacture of TPO membranes. The propylene content, as well as the molecular weight of these polymers, can be adjusted to alter the stiffness of the TPO sheet within limits. And, the propylene content of the these sheets results in very little surface tack, which is quantified by a relatively low coefficient of friction.

TPO membranes based upon ethylene-based block copolymers have also been proposed. For example, U.S. Publ. No. 2015/314511 teaches a roofing membrane prepared, by counter-rotating extrusion, from a composition including (i) an olefin block copolymer, (ii) a polyolefin, and (iii) a granular flame retardant. Similarly, U.S. Publ. No. 2015/0038629 teaches roofing membranes prepared from a composition including (i) an olefin block copolymer, (ii) a propylene-alpha-olefin interpolymer, and (iii) a halogen-free flame retardant.

SUMMARY OF THE INVENTION

One or more embodiments of the present invention provide a thermoplastic roofing membrane comprising a planar-shaped thermoplastic body, said planar body having opposed first and second external planar surfaces, where said first surface includes an ethylene-based olefinic block copolymer and a fatty acid amide, where the amount of fatty acid amide provides the surface with a coefficient of friction (ASTM D 1894) of less than 0.250.

Other embodiments of the present invention provide a method of forming an adhered roof system, the method comprising of adhering the membrane of any of the preceding claims to a roof substrate so that layer including the ethylene-based olefinic block copolymer and a fatty acid amide is exposed to the environment upon installation.

DETAILED DESCRIPTION OF ILLUSTRATIVE EMBODIMENTS

Embodiments of the present invention are based, at least in part, on the discovery of thermoplastic roofing membranes that include a top layer including an ethylene-based olefinic block copolymer and a threshold level of one or more particular fatty acid amides. It has unexpectedly been discovered that by including particular fatty acid amides at loadings above critical levels, the ability to install the membranes within adhered roofing systems can be markedly improved without deleteriously impacting other features of the membrane, such as the ability to weld or adhere the seams of adjacent membranes. Thus, while the prior art generally suggests the use of blocking agents or slip agents in the manufacture of thermoplastic roofing membranes, such as those prepared with ethylene-based olefinic block copolymers, the present invention overcomes problems associated with the prior art membranes relative to the degree of tack, which can be represented by a coefficient of friction, that has been experienced with these prior art membranes. In particular, it has been observed that thermoplastic membranes that include significant levels of ethylene-based olefinic block copolymer within the top layer do not allow for the desired movement of the membrane during installation, which includes folding the membrane onto itself and then manipulating it into an installed position.

Membrane Construction

Figure 1:
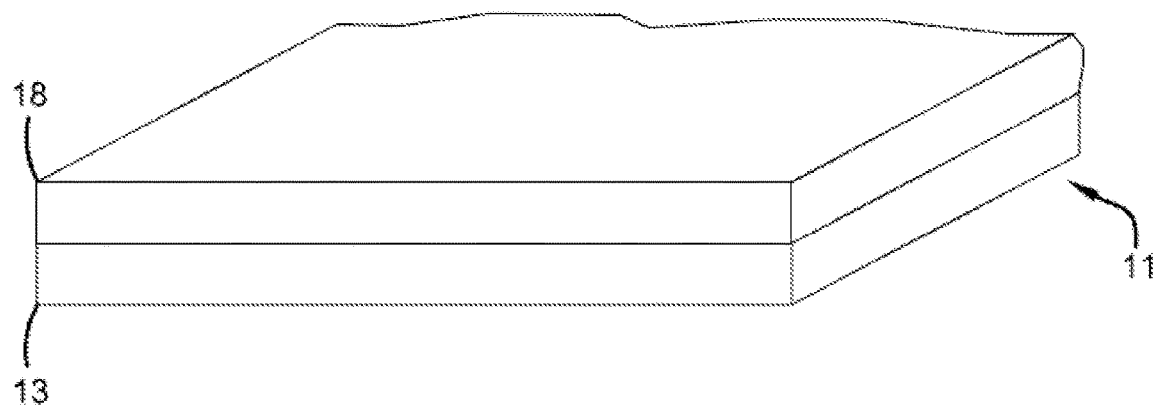
FIG. 1 is a perspective view of a single-extrudate membrane according to embodiments of the present invention.

Membranes according to one or more embodiments of the present invention can be described with reference to FIG. 1. In this embodiment, the membrane includes planar body 11, which also may be referred to as sheet 11 or panel 11. In one or more embodiments, panel 11 is a planar body that consists of a single extrudate. In one or more embodiments, planar body 11 may be compositionally homogeneous or, in other embodiments, planar body 11 may include one or more compositionally distinct layers 13 and 18. For example, compositionally distinct layers 13 and 18 may be formed through coextrusion techniques, and reference may therefore be made to coextruded layers 13 and 18, or first coextruded layer 13 and second coextruded layer 18.

Figure 2:
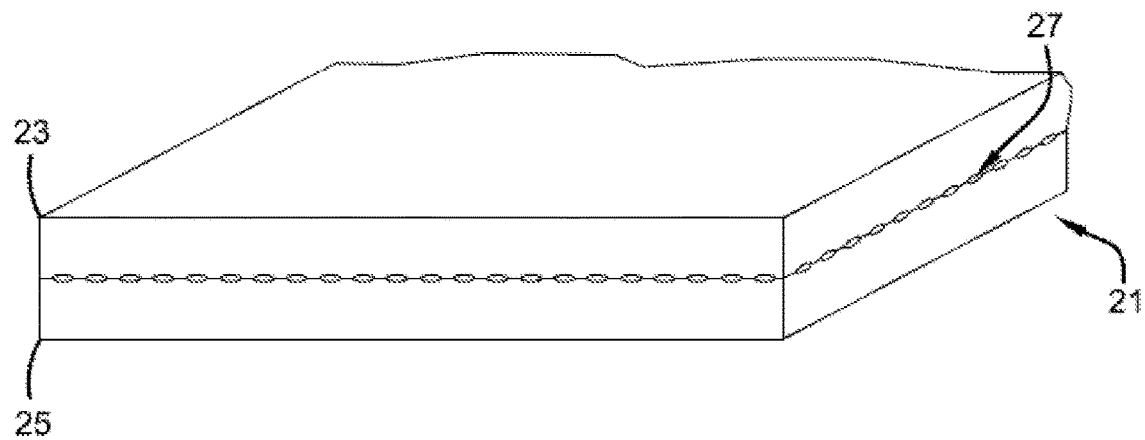
FIG. 2 is a perspective view of a laminate membrane according to embodiments of the present invention.
Figure 3:
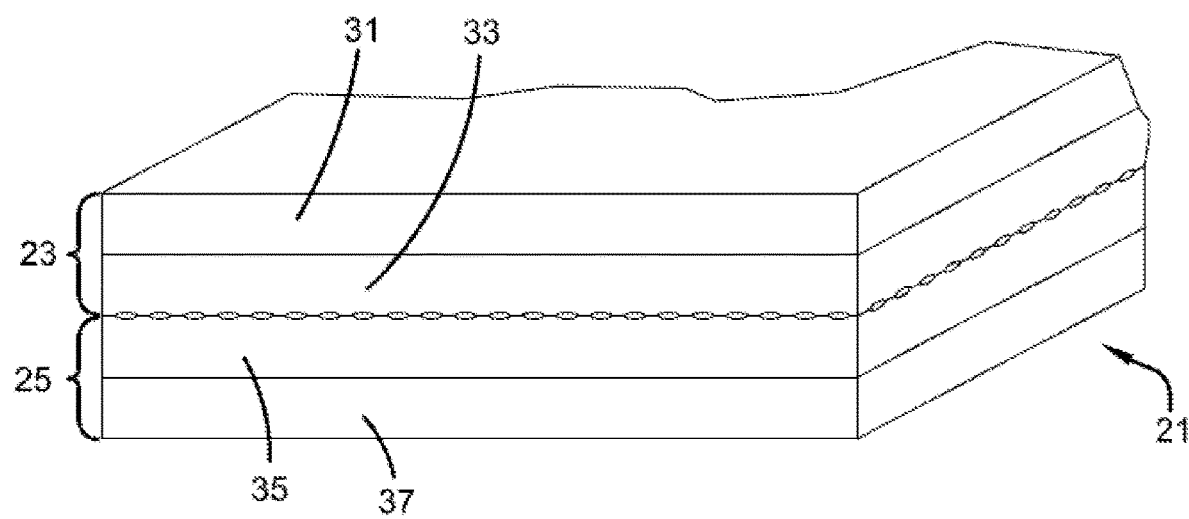
FIG. 3 is a perspective view of laminate membrane according to embodiments of the present invention.

In other embodiments, the membranes of one or more embodiments of the present invention may include two or more laminated layers. For example, as shown in FIG. 2, membrane 21 may include first layer 23 and second layer 25, which are laminated to one another, optionally with a reinforcing scrim 27 disposed between laminated layers 23 and 25. First layer 23 and second layer 25 may be compositionally similar with respect to one another. Or, in other embodiments, the layers may be compositionally distinct. Additionally, layers 23 and 25 may, within themselves, be compositionally homogeneous or, in other embodiments, they may be non-homogeneous. For example, first layer 23, second layer 25, or both layers 23 and 25, may include compositionally distinct coextruded layers. As shown in FIG. 3, first layer 23 may include compositionally distinct coextruded layers 31 and 33, and second layer 25 may include compositionally distinct coextruded layers 35 and 37.

As suggested above, the top layer of the membranes of this invention, which is the planar surface of the membrane that is exposed to the weather upon installation, includes an ethylene-based olefinic block copolymer. For example, the top layer may include layer 18 of membrane 11 shown in FIG. 1, layer 23 of membrane 21 shown in FIG. 2, or layer 31 of membrane 21 shown in FIG. 3. Additionally, one or more of the other layers of the membrane may include ethylene-based olefinic block copolymer. In particular embodiments, the bottom layer of the membranes of this invention, which is the planar surface of the membrane in contact with the adhesive when installed, may also include ethylene-based olefinic block copolymer. For example, bottom layer may include layer 13 of membrane 11 shown in FIG. 1, layer 25 of membrane 21 shown in FIG. 2, or layer 37 of membrane 21 shown in FIG. 3. In one or more embodiments, one or more of the other layers of the membrane may be devoid or substantially devoid of ethylene-based olefinic block copolymer.

In yet other embodiments, and with reference to FIG. 3, upper middle layer 33, as well as lower middle layer 35 and bottom layer 37 may include the ethylene-based olefinic block copolymer. Additionally, in certain embodiments, bottom layer 37 includes a functionalized thermoplastic resin. In one or more embodiments, top layer 31 includes flame retardants and other weathering additives that provide sufficient environmental protection to the polymers, while at least one of layers 33, 35, and 37 may include fillers such as mineral fillers (e.g. calcium carbonate).

As also suggested above, and which will be described in greater detail below, the top layer of the membranes of this invention, which is the planar surface of the membrane that is exposed to the weather upon installation, includes a threshold level of one or more fatty acid amides. For example, top layer may include layer 13 of membrane 11 shown in FIG. 1, layer 23 of membrane 21 shown in FIG. 2, or layer 31 of membrane 21 shown in FIG. 3. Additionally, one or more of the other layers of the membrane may include a fatty acid amide. In one or more embodiments, the other layers of the membrane may include one or more fatty acid amides below the threshold amounts defined herein. In one or more embodiments, one or more of the other layers of the membrane may be devoid or substantially devoid of fatty acid amides.

Membrane Composition

In one or more embodiments, the polymeric composition of one or more layers includes ethylene-based olefinic block copolymer (EBOC). In these or other embodiments, the polymeric composition of one or more layers of the membrane includes a blend of a first ethylene-based olefinic block copolymer (first EBOC), which is characterized by a relatively low melt flow rate, and a second ethylene-based olefinic block copolymer (second EBOC), which is characterized by a relatively high melt flow rate. In one or more embodiments, the one or more layers of the membrane including the EBOC (e.g. a layer including the blend of the first EBOC and the second EBOC) also include yet another distinct thermoplastic resin.

EBOC

In general, the ethylene-based olefinic block copolymers (EBOC) include block copolymers including a first plurality of ethylene-α-olefin blocks having low α-olefin content and a second plurality of ethylene-α-olefin blocks having a high α-olefin content. For purposes of this specification, the α-olefin may be referred to as a comonomer. Also, for purposes of this specification, the first plurality may be referred to as the hard blocks since these blocks are characterized by a relatively high melt temperature, and the second plurality of blocks may be referred to as the soft blocks since these block are characterized by a low glass transition temperature. In one or more embodiments, the hard blocks are crystallizable and the soft blocks are amorphous. In one or more embodiments, the α-olefin includes $C_4$ or higher α-olefins. In particular embodiments, the α-olefin is selected from butane, hexene, and octene. In particular embodiments, the α-olefin is octene.

In one or more embodiments, the ethylene-based olefinic block copolymer includes hard and soft blocks alternating in $(AB)_n$ pattern where A is a hard block, B is a soft block, and $n$ is an integer greater than 1 including 2, 3, 4, 5, 10, 20, 40, 60, 80, 100, or higher.

As suggested above, the hard blocks, which may also be referred to as hard segments, have a relatively low comonomer content (i.e., α-olefin). In one or more embodiments, the comonomer content (i.e., comonomer in polymerized form) of the hard block is less than 5 wt %, in other embodiments less than 2 wt %, and in other embodiments less than 1 wt %, with the balance of the polymeric units deriving from ethylene. Accordingly, the hard segments may include greater than 95 wt %, in other embodiments greater than 98 wt %, and in other embodiments greater than 99 wt % polymeric units deriving from ethylene. In particular embodiments, the hard segments exclusively include or substantially include ethylene-derived units.

The soft block, which may also be referred to as soft segments, have a relatively high comonomer content (i.e., α-olefin). In one or more embodiments, the comonomer content (i.e., comonomer in polymerized form) of the soft block is greater than 5 wt %, in other embodiments greater than 8 wt %, in other embodiments greater than 10 wt %, in other embodiments greater than 15 wt %, in other embodiments greater than 25 wt %, in other embodiments greater than 35 wt %, in other embodiments greater than 45 wt %, and in other embodiments greater than 60 wt %, with the balance including ethylene-derived units.

In one or more embodiments, the ethylene-based olefinic block copolymers employed in the present invention are characterized by a density of less than 0.9 g/cm$^3$, in other embodiments less than 0.89 g/cm$^3$, in other embodiments less than 0.885 g/cm$^3$, and in other embodiments less than 0.875 g/cm$^3$. In these or other embodiments, the density of the ethylene-based olefinic block copolymers is greater than 0.85 g/cm$^3$ and in other embodiments greater than 0.86 g/cm$^3$. As the skilled person appreciates, density can be determined according to ASTM D-792.

In one or more embodiments, the ethylene-based olefinic block copolymers employed in the present invention are characterized by a melt temperature, as measured by differential scanning calorimetry as described in U.S. Publ. No. 2006/0199930, of at least 105, in other embodiments at least 110, in other embodiments at least 115, and in other embodiments at least 120° C. In these or other embodiments, the ethylene-based olefinic block copolymers are characterized by a melt temperature of less than 130 and in other embodiments less than 125° C.

In one or more embodiments, the first EBOC, which is characterized by a relatively low melt index, may have a melt index, as determined by ASTM D1238 or ISO 1133 (2.16 kg load at 190° C.), of less than 5 g/10 min, in other embodiments less than 2 g/10 min, and in other embodiments less than 1 g/10 min. In these or other embodiments, the melt index of the first EBOC is from about 0.1 to about 5 g/10 min, in other embodiments from about 0.3 to about 2 g/10 min, and in other embodiments from about 0.5 to about 1 g/10 min.

In one or more embodiments, the second EBOC, which is characterized by a relatively high melt index, as determined by ASTM D1238 or ISO 1133 (2.16 kg load at 190° C.), may have a melt index of greater than 5 g/10 min, in other embodiments greater than 15 g/10 min, and in other embodiments greater than 25 g/10 min. In these or other embodiments, the melt index of the second EBOC is from about 5 to about 50 g/10 min, in other embodiments from about 15 to about 40 g/10 min, and in other embodiments from about 25 to about 35 g/10 min.

In one or more embodiments, the ethylene-based olefinic block copolymers employed in the present invention are characterized by a glass transition temperature, as measured by differential scanning calorimetry, of at less than 0° C., in other embodiments less than −20° C., in other embodiments less than −30° C., in other embodiments less than −40° C., and in other embodiments less than −50° C. In these or other embodiments, the ethylene-based olefinic block copolymers are characterized by a glass transition temperature of from about −70° C. to 0° C., or in other embodiments from about −50° C. to about 0° C.

Useful ethylene-based olefinic block copolymers that may be employed in the present invention are known in the art as described in U.S. Pat. Nos. 7,893,166 and 7,355,089 and U.S. Publ. No. 2010/0084158, which are incorporated herein by reference. Useful ethylene-based olefinic block copolymers are commercially available under the tradename INFUSE (Dow Chemical Company) including those specific polymers available under the tradenames 9010 and 9900.

Fatty Acid Amides

In one or more embodiments, the fatty acid amide employed in the practice of the present invention is an unsaturated fatty acid amide.

In one or more embodiments, the unsaturated fatty acid includes a single double bond. In other embodiments, the unsaturated fatty acid includes two double bonds. In other embodiments, the unsaturated fatty acid includes three double bonds. In one or more embodiments, the unsaturated fatty acid includes more than three double bonds. In one or more embodiments, the unsaturated fatty acid includes one or more double bonds in the cis configuration. In these or other embodiments, the unsaturated fatty acid includes one or more double bonds in the trans configuration.

In one or more embodiments, the fatty acid amide employed in the practice of this invention is characterized by a threshold (i.e., has a minimum) molecular weight. In one or more embodiments, the fatty acid amides have a molecular weight of greater than 250 g/mol, in other embodiments greater than 275 g/mol, in other embodiments greater than 300 g/mol, in other embodiments greater than 325 g/mol, and in other embodiments greater than 335 g/mol. In these or other embodiments, the fatty acids amides are characterized by a molecular weight of less than 1,000 g/mol, in other embodiments less than 750 g/mol, and in other embodiments less than 500 g/mol. In one or more embodiments, the fatty acid amide employed in the practice of this invention is characterized by a molecular weight of about 250 to about 1,000, in other embodiments from about 300 to about 750, and in other embodiments from about 325 to about 500 g/mol.

Examples of unsaturated fatty acid amides include myristoleamide, palmitoleamide, sapienamide, oleamide, elaidamide, vaccenamide, linoleamide, linoelaidamide, alpha-linolenamide, arachidonamide, eicosapentaenoamide, erucamide, and docosahexaenoamide. In particular embodiments, the fatty acid amide is erucamide.

Distinct Thermoplastic Resins

As suggested above, the one or more layers of the thermoplastic membranes of the present invention that include the ethylene-based olefinic block copolymer may also include a distinct thermoplastic resin, which is a thermoplastic resin other than the ethylene-based olefinic block copolymer. Also, the other optional layers of the thermoplastic membranes of this invention that may not include ethylene-based olefinic block copolymer may include one or more non-ethylene-based olefinic block copolymers. In one or more embodiments, the non-ethylene-based olefinic block copolymers (i.e., distinct thermoplastic resins) may include thermoplastic polyolefins of the type conventionally employed in the manufacture of thermoplastic membranes. In these or other embodiments, the non-ethylene-based olefinic block copolymers may include polyethylene copolymers. In yet other embodiments, the non-ethylene-based olefinic block copolymers may include propylene-based elastomers.

Thermoplastic Polyolefins (TPOs)

In one or more embodiments, the thermoplastic olefinic polymer (TPO) employed in one or more embodiments of this invention may include an olefinic reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradenames HIFAX™ or Adflex™ (Lyondellbassel); these materials are believed to include in-reactor blends of ethylene-propylene rubber and polypropylene or polypropylene copolymers. Other useful thermoplastic olefins include those available under the tradename T00G-00 (Ineos). In one or more embodiments, the in-reactor copolymers may be physically blended with other polyolefins. For example, in reactor copolymers may be blended with linear low density polyethylene.

In other embodiments, the thermoplastic component may include a physical blend of chemically-distinct olefinic polymers. In one or more embodiments, blends of propylene-based thermoplastic polymer, plastomer, and/or low density polyethylene may be used. Useful blends include those described in International Application No. PCT/US2006/0033522 which is incorporated herein by reference. In other embodiments, the thermoplastic olefinic component is a blend of a linear low density polyethylene and a propylene-based plastic.

Polyethylene Copolymers

In one or more embodiments, the polyethylene copolymers include ethylene-α-olefin copolymer. In one or more embodiments, the polyethylene copolymer is low density polyethylene such as linear low density polyethylene. The polyethylene copolymer employed in one or more embodiments of this invention may be similar to that described in U.S. Pat. No. 5,266,392, which is incorporated herein by reference. This copolymer may include from about 2.5 to about 13 mole percent, and in other embodiments from about 3.5 to about 10 mole percent, mer units deriving from α-olefins, with the balance including mer units deriving from ethylene. The α-olefin included in the polyethylene copolymer of one or more embodiments of this invention may include comonomer units deriving from butene-1, pentene-1, hexene-1, octene-1, or 4-methyl-pentene-1. In one or more embodiments, the polyethylene copolymer is devoid or substantially devoid of propylene mer units (i.e., units deriving from propylene). Substantially devoid refers to that amount or less of propylene mer units that would otherwise have an appreciable impact on the copolymer or the compositions of this invention if present.

The polyethylene copolymer employed in one or more embodiments of this invention can be characterized by a density of from about 0.885 g/cc to about 0.930 g/cc, in other embodiments from about 0.900 g/cc to about 0.920 g/cc, and in other embodiments from about 0.900 g/cc to about 0.910 g/cc per ASTM D-792.

In one or more embodiments, the polyethylene copolymer may be characterized by a melt index of from about 0.2 to about 50 dg/min, in other embodiments from about 0.4 to about 20 dg/min, and in other embodiments from about 0.6 to about 10 dg/min per ASTM D1238 or ISO 1133 at 190° C. and 2.16 kg load.

The polyethylene copolymer of one or more embodiments of this invention may be prepared by using a convention Ziegler Natta coordination catalyst system.

Useful polyethylene copolymers include those that are commercially available. For example, polyethylene copolymer can be obtained under the tradename Dowlex™ 2038, 2045, and 2267G (Dow); under the tradename DFDA-1010 NT7 (Dow); or under the tradename GA502023 (Lyondell); or under the tradename LLDPE LL (ExxonMobil).

Propylene-Based Elastomers

In one or more embodiments, useful propylene-based elastomers include propylene-based elastomers that have isotactic propylene sequences long enough to crystallize. In this regard, U.S. Pat. No. 6,927,258, and U.S. Publ. Nos. 2004/0198912 and 2010/0197844 are incorporated herein by reference. In one or more embodiments, the propylene-based elastomer is propylene/alpha-olefin copolymer with semi-crystalline isotactic propylene segments. The alpha-olefin content (e.g., polymerized ethylene content) may range from about 5 to about 18%, or in other embodiments from about 10 to about 15%.

In one or more embodiments, the propylene-based elastomer is characterized by a melting point that is less than 110° C. and a heat of fusion of less than 75 J/g. In one embodiment, the propylene based elastomers of the present invention have a glass transition temperature (Tg) range of about −25 to −35° C. The Tg as used herein is the temperature above which a polymer becomes soft and pliable, and below which it becomes hard and glassy. The propylene based plastomers and elastomers of the present invention have a MFR range measured at 230° C. of between about 0.5 to about 25, and a melt temperature range of about 50 to 120° C. In one embodiment, the propylene based elastomers of the present invention have a shore A hardness range of about 60 to about 90.

In one or more embodiments, the propylene-based elastomer is blended with a propylene-based thermoplastic resin, which may include a crystalline resin. In particular embodiments, the propylene-based thermoplastic resin is characterized by a melting point that is greater than 110° C., in other embodiments greater than 120° C., and in other embodiments greater than 130° C., and a heat of fusion greater than 75 J/g, in other embodiments greater than 80 J/g, and in other embodiments greater than 85 J/g. In one or more embodiments, the propylene-based thermoplastic resin is stereoregular polypropylene. In one or more embodiments, the ratio of the propylene-based elastomer to the propylene-based thermoplastic resin within the blend composition may vary in the range of 1:99 to 95:5 by weight and, in particular, in the range 2:98 to 70:30 by weight.

In one embodiment, the propylene-based elastomers may have a flexural modulus range of about 500 to about 6000 psi, preferably about 1500-5000 psi.

Functionalized Thermoplastic Resin

As suggested above, one or more layers of the membranes of the present invention may include a functionalized thermoplastic resin. In one or more embodiments, the functionalized polymer is a thermoplastic polymer that includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester halide, amine, imine, nitrile, oxirane (e.g., epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° C. to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization, in these or other embodiments, the functionalized thermoplastic polymers may include less than 10% by weight, in other embodiments less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), and EXXELOR™ (ExxonMobil). Another example includes polymers or oligomers including one or more glycidyl methacrylate groups such as Lotader™ AX8950 (Arkema).

Mineral Filler

In one or more embodiments, the fillers, which may also be referred to as mineral fillers, include inorganic materials that may aid in reinforcement, heat aging resistance, green strength performance, and/or flame resistance. In other embodiments, these materials are generally inert with respect to the composition therefore simply act as diluent to the polymeric constituents. In one or more embodiments, mineral fillers include clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, and mixtures thereof. In one or more embodiments, the fillers are not surface modified or surface functionalized.

Suitable clays may include airfloated clays, water-washed clays, calcined clays, surface-treated clays, chemically-modified clays, and mixtures thereof.

Suitable silicates may include synthetic amorphous calcium silicates, precipitated, amorphous sodium aluminosilicates, and mixtures thereof.

Suitable silica (silicon dioxide) may include wet-processed, hydrated silicas, crystalline silicas, and amorphous silicas (noncrystalline).

In one or more embodiments, the mineral fillers are characterized by an average particle size of at least 1 µm, in other embodiments at least 2 µm, in other embodiments at least 3 µm, in other embodiments at least 4 µm, and in other embodiments at least 5 µm. In these or other embodiments, the mineral fillers are characterized by an average particle size of less than 15 µm, in other embodiments less than 12 µm, in other embodiments less than 10 µm, and in other embodiments less than 8 µm. In these or other embodiments, the mineral filler has an average particle size of between 1 and 15 µm, in other embodiments between 3 and 12 µm, and in other embodiments between 6 and 10 µm.

Other Ingredients

The thermoplastic membranes of the present invention (e.g., one or more layers of the membranes) may also include other ingredients such as those that are convention in thermoplastic membranes. For example, other useful additives or constituents may include flame retardants, stabilizers, pigments, and fillers.

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle).

In one or more embodiments, the use of char-forming flame retardants (e.g. ammonium polyphosphate and melamine polyphosphate) has unexpectedly shown advantageous results when used in conjunction with nanoclay within the cap layer of the laminates of the present invention. It is believed that there may be a synergistic effect when these compounds are present in the cap layer. As a result, the cap layer of the laminates of the certain embodiments of the present invention are devoid of or substantially devoid of halogenated flame retardants and/or flame retardants that release water upon thermal decomposition. Substantially devoid referring to that amount or less that does not have an appreciable impact on the laminates, the cap layer, and/or the burn resistivity of the laminates.

In one or more embodiments, the membranes of the invention may include a stabilizers. Stabilizers may include one or more of a UV stabilizer, an antioxidant, and an antiozonant. UV stabilizers include Tinuvin™ 622. Antioxidants include Irganox™ 1010.

In one or more embodiments, one or more layers of the membranes of the present invention may include expandable graphite, which may also be referred to as expandable flake graphite, intumescent flake graphite, or expandable flake. Generally, expandable graphite includes intercalated graphite in which an intercalant material is included between the graphite layers of graphite crystal or particle. Examples of intercalant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercalant materials. In certain embodiments, the expandable graphite includes sulfate intercalants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation. Expandable graphite useful in the applications of the present invention are generally known as described in International Publ. No. WO/2014/078760, which is incorporated herein by reference.

Commercially available examples of expandable graphite include HPMS Expandable Graphite (HP Materials Solutions, Inc., Woodland Hills, CA) and Expandable Graphite Grades 1721 (Asbury Carbons, Asbury, NJ). Other commercial grades contemplated as useful in the present invention include 1722, 3393, 3577, 3626, and 1722HT (Asbury Carbons, Asbury, NJ).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

In one or more embodiments, one or more layers of the membranes of the present invention include a nanoclay. Nanoclays include the smectite clays, which may also be referred to as layered silicate minerals. Useful clays are generally known as described in U.S. Pat. No. 6,414,070 and U.S. Pat. Publ. No. 2009/0269565, which are incorporated herein by reference. In one or more embodiments, these clays include exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate can facilitate the intercalation of the clay with other materials. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups are desirably present on the clay surface. Intercalation by absorption can take place when either acid or non-acid clays are used as the starting material. Cation exchange can take place if an ionic clay containing ions such as, for example, $Na^+$, $K^+$, $Ca^{++}$, $Ba^{++}$, and $Li^+$ is used. Ionic clays can also absorb dipolar organic molecules.

Smectite clays include, for example, montmorillonite, saponite, beidellite, hectorite, and stevensite. In one or more embodiments, the space between silicate layers may be from about 15 to about 40×, and in other embodiments from about 17 to about 36×, as measured by small angle X-ray scattering. Typically, a clay with exchangeable cations such as sodium, calcium and lithium ions may be used. Montmorillonite in the sodium exchanged form is employed in one or more embodiments Organic swelling agents that can be used to treat the clay include quaternary ammonium compound, excluding pyridinium ion, such as, for example, poly(propylene glycol)bis (2-aminopropyl ether), poly(vinylpyrrolidone), dodecylamine hydrochloride, octadecylamine hydrochloride, and dodecylpyrrolidone. These treated clays are commercially available. One or more of these swelling agents can be used. Amounts In one or more embodiments, the ethylene-based olefinic block copolymer may form the entire thermoplastic component of the given layer in which the ethylene-based olefinic block copolymer is present. As suggested above, in other embodiments, the ethylene-based olefinic block copolymer is present in conjunction with a distinct and/or complementary thermoplastic polymer within the given layer in which the ethylene-based olefinic block copolymer is present.

Ethylene-Based Olefinic Block Copolymer

In one or more embodiments, the layer in which the ethylene-based olefinic block copolymer is present (e.g., the top layer) includes at least 10 wt %, in other embodiments at least 40 wt %, in other embodiments at least 60 wt %, in other embodiments at least 70 wt %, and in other embodiments at least 80 wt % ethylene-based olefinic block copolymer based upon the total weight of the ethylene-based olefinic block copolymer and any complementary thermoplastic material (i.e. the total weight polymeric content of the layer). In these or other embodiments, the layer in which the ethylene-based olefinic block copolymer is present includes less than 100 wt %, in other embodiments less than 90 wt %, and in other embodiments less than 85 wt % ethylene-based olefinic block copolymer based upon the total weight of the ethylene-based olefinic block copolymer and any complementary thermoplastic material (i.e., the total polymeric content of the layer). In one or more embodiments, the layer in which the ethylene-based olefinic block copolymer is present includes from about 10 to about 100, in other embodiments from about 20 to about 90, in other embodiments from about 40 to about 85, in other embodiments from about 50 to about 80, in other embodiments from about 55 to about 85, and in other embodiments from about 60 to about 80 wt % ethylene-based olefinic block copolymer based upon the total weight of the ethylene-based olefinic block copolymer and any complementary thermoplastic material (i.e., the total polymeric content of the layer).

In one or more embodiments, where the one or more layers including the ethylene-based olefinic block copolymer includes a first EBOC (e.g., low melt index) and a second EBOC (e.g. high melt index), these one or more layers may include at least 40, in other embodiments at least 50, and in other embodiments at least 60 wt % of the first EBOC based upon the total weight of the first EBOC and the second EBOC combined. In these or other embodiments, these layers may include at most 99, in other embodiments at most 90, and in other embodiments at most 80 wt % of the first EBOC based upon the total weight of the first EBOC and the second EBOC combined. In one or more embodiments, these layers may include from about 30 to about 99, in other embodiments from about 50 to about 90, and in other embodiments from about 60 to about 80 wt % of the first EBOC based upon the total weight of the first EBOC and the second EBOC combined.

In one or more embodiments, where the one or more layers including the ethylene-based olefinic block copolymer includes a first EBOC (e.g., low melt index) and a second EBOC (e.g. high melt index), these one or more layers may include at least 1, in other embodiments at least 10, and in other embodiments at least 20 wt % of the second EBOC based upon the total weight of the first EBOC and the second EBOC combined. In these or other embodiments, these layers may include at most 70, in other embodiments at most 50, and in other embodiments at most 40 wt % of the second EBOC based upon the total weight of the first EBOC and the second EBOC combined. In one or more embodiments, these layers may include from about 1 to about 70, in other embodiments from about 10 to about 50, and in other embodiments from about 20 to about 40 wt % of the second EBOC based upon the total weight of the first EBOC and the second EBOC combined.

Fatty Acid Amide

In one or more embodiments, the top layer of the membranes of the present invention may include greater than 0.20 wt %, in other embodiments greater than 0.30 wt %, in other embodiments greater than 0.40 wt %, in other embodiments greater than 0.50 wt %, in other embodiments greater than 0.60 wt %, and in other embodiments greater than 0.70 wt % fatty acid amide based on the total weight of the layer. In these or other embodiments, the top layer of the membranes of the present invention may include less than 2.0 wt %, in other embodiments less than 1.8 wt %, in other embodiments less than 1.5 wt %, in other embodiments less than 1.4 wt %, in other embodiments less than 1.3 wt %, and in other embodiments less than 1.0 wt % fatty acid amide based upon the total weight of the layer. In one or more embodiments, the top layer of the membranes of the present invention may include from about 0.20 wt % to about 2.0 wt %, in other embodiments from about 0.30 wt % to about 1.8 wt %, in other embodiments from about 0.40 wt % to about 1.5 wt %, in other embodiments from about 0.50 wt % to about 1.4 wt %, in other embodiments from about 0.60 wt % to about 1.3 wt %, in other embodiments from about 0.70 wt % to about 1.0 wt % fatty acid amide based upon the total weight of the layer.

In the alternative, the amount of fatty acid amide present in the top layer may be described based upon the parts by weight (pbw) of fatty acid amide relative to 100 pbw of the polymeric content of the layer (php). In one or more embodiments, the top layer of the membranes of the present invention may include greater than 0.10 pbw, in other embodiments greater than 0.20 pbw, in other embodiments greater than 0.25 pbw, in other embodiments greater than 0.30 pbw, and in other embodiments greater than 0.40 pbw fatty acid amide per 100 parts by weight of the polymeric content of the layer (php). In these or other embodiments, the top layer of the membranes of the present invention may include less than 1.2 pbw, in other embodiments less than 1.0 pbw, in other embodiments less than 0.9 pbw, in other embodiments less than 0.8 pbw, and in other embodiments less than 0.6 pbw fatty acid amide php. In one or more embodiments, the top layer of the membranes of the present invention may include from about 0.10 to about 1.2 pbw, in other embodiments from about 0.20 to about 1.0 pbw, in other embodiments from about 0.25 to about 0.9 pbw, in other embodiments from about 0.30 to about 0.8 pbw, and in other embodiments from about 0.40 to about 0.6 pbw fatty acid amide php.

Filler

In one or more embodiments, one or more layers of the membranes of the present invention may include greater than 5 wt %, in other embodiments greater than 20 wt %, and in other embodiments greater than 30 wt % of the filler (e.g., mineral filler) based on the entire weight of the given layer of the membrane that includes the filler. In these or other embodiments, one or more layers of the membranes of the present invention may include less than 70 wt %, in other embodiments less than 50 wt %, and in other embodiments less than 30 wt % of a filler based on the entire weight of the given layer of the membrane that includes the filler. In one or more embodiments, the one or more layers of the membranes of the present invention may include from about 1 to about 70 wt %, in other embodiments from about 5 to about 50 wt %, and in other embodiments from about 10 to about 30 wt % of the filler based upon the entire weight of the given layer of the membrane that includes the filler.

Method of Making

In one or more embodiments, the compositions and membranes of the present invention may be prepared by employing conventional techniques. The polymeric composition that may be extruded to form the polymeric sheet may include the ingredients or constituents described herein. For example, the polymeric composition may include thermoplastic polyolefin, filler, and ethylene-based olefin block copolymers defined herein. The ingredients may be mixed together by employing conventional polymer mixing equipment and techniques. In one or more embodiments, an extruder may be employed to mix the ingredients. For example, single-screw or twin-screw extruders may be employed. For example, the various ingredients can be separately fed into a reaction extruder and pelletized or directly extruded into membrane or laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet (i.e. layer) on and/or below a reinforcement (e.g., a scrim). In other embodiments, the polymeric layer may be prepared as separate sheets, and the sheets may then be calandered with the scrim sandwiched there between to form a laminate. In one or more embodiments, one or more layers of the membranes of the present invention are prepared by employing coextrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

Membrane Characteristics

As discussed above, the membranes employed in the practice of this invention are advantageously characterized by a relatively high flexibility and low stiffness. This relatively high flexibility and low stiffness can be quantified through one or more physical properties of the membranes of this invention. For example, in one or more embodiments, storage modulus, as may be measured using dynamic mechanical analysis (DMA) may be indicative of high flexibility and low stiffness. According to embodiments of the present invention, storage modulus can be determined by using, for example, a TA Instrument Q800 DMA instrument coupled with a GCA cooling unit and the use of liquid nitrogen. A rectangular specimen of about 18.5 mm in length, 5.3 mm in width, and 1.4 mm in thickness is used and can be prepared by using a 5.3 mm film cutter (TA Instrument part number 984486.901). The specimen is loaded onto a thin film clamp using a 3 pound-force inch torque. A multi-frequency strain mode can be used for all experiments. The parameters should be customized to a 1 Hz single frequency and the amplitude kept at 10 μm. The specimen should be equilibrated at −90° C., and then ramped to 70° C.

at a 2° C./minute heating rate. In view of the fabric scrim, samples can be run in duplicates for the machine direction and cross direction.

In one or more embodiments, the membranes of one or more embodiments of the present invention are characterized by a storage modulus, as determined by DMA as described herein, in the machine direction at 0° C. of less than 450 MPa, in other embodiments less than 425 MPa, in other embodiments less than 400 MPa, in other embodiments less than 375 MPa, in other embodiments less than 350 MPa, and in other embodiments less than 325 MPa. In these or other embodiments, the membranes of one or more embodiments of the present invention are characterized by a storage modulus, as determined by DMA as described herein, in the machine direction at 0° C., of from about 100 to about 450 MPa, in other embodiments from about 110 to about 400 MPa, and in other embodiments from about 125 to about 350 MPa.

In one or more embodiments, the membranes of one or more embodiments of the present invention are characterized by a storage modulus, as determined by DMA as described herein, in the machine direction at −20° C. of less than 850 MPa, in other embodiments less than 800 MPa, in other embodiments less than 750 MPa, in other embodiments less than 725 MPa, in other embodiments less than 700 MPa, and in other embodiments less than 675 MPa. In these or other embodiments, the membranes of one or more embodiments of the present invention are characterized by a storage modulus, as determined by DMA as described herein, in the machine direction at −20° C., of from about 400 to about 850 MPa, in other embodiments from about 450 to about 800 MPa, and in other embodiments from about 500 to about 750 MPa.

In one or more embodiments, the membranes may be characterized by a flexural modulus, as determined by ASTM D790, of less than 90 MPa, in other embodiments less than 80 MPa, in other embodiments less than 70 MPa, in other embodiments less than 60 MPa, in other embodiments less than 50 MPa, in other embodiments less than 40 MPa, and in other embodiments less than 30 MPa. In these or other embodiments, the membranes may be characterized by a flexural modulus of from about 5 to about 90 MPa, in other embodiments from about 10 to about 80 MPa, and in other embodiments from about 20 to about 70 MPa.

In one or more embodiments, the membranes employed in the practice of this invention are advantageously characterized by a relatively low Shore hardness (e.g., low Shore A or Shore D). In one or more embodiments, the membranes may be characterized by a Shore D hardness, as determined by ASTM D2240, of less than 40, in other embodiments less than 30, and in other embodiments less than 20. In these or other embodiments, the membranes may be characterized by a hardness of from about 70 Shore A to about 40 Shore D, in other embodiments from about 80 Shore A to about 30 Shore D, and in other embodiments from about 90 Shore A to about 20 Shore D.

Coefficient of Friction

As suggested above, the top layer of the membranes of the present invention are characterized by an advantageously low coefficient of friction. For purposes of this specification, the determination of the coefficient of friction is carried out using TLMI instrument with a sled weight pursuant to ASTM D1894 standard for static and kinetic coefficient of friction of plastic film and sheeting. In one or more embodiments, the top layer of the membranes of the present invention are characterized by a coefficient of friction of less than 0.250, in other embodiments less than 0.220, in other embodiments less than 0.200, and in other embodiments less than 0.190 µm.

Method of Installing

As suggested above, the membranes of the present invention facilitate installation of the membranes into adhered roofing systems (e.g., fully-adhered systems). Generally, methods for forming adhered systems include folding the membrane onto itself (once positioned on the roof) so that the top layer of a first portion of the membrane contacts the top layer of the other portion of the membrane. The portion of the membrane positioned on top of the other portion of the membrane, relative to the building, is then slid across the top surface of the portion that is lower or below, relative to the building, and then the bottom layer of this portion of the membrane is mated to the building substrate by way of an adhesive. The adhesive may be applied to the building substrate (i.e., the roof substrate) or it may be factory applied to the membrane itself. In the case of the latter, a release liner is typically removed from those portions of the membrane that are then most immediately contacted to the roof substrate. For membranes that carry factory-applied adhesives, reference can be made to U.S. Publication No. 2016/0230392, which is incorporated herein by reference. The same general procedure is followed for the other portion of the membrane.

Figure 5:
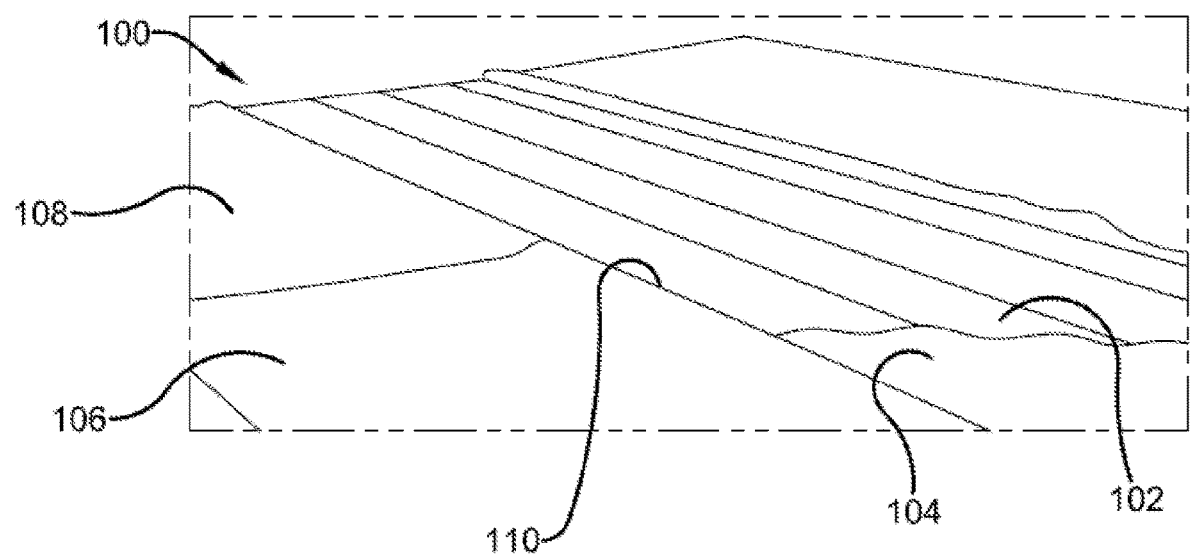
FIG. 5 is a picture showing aspects of one or more methods of the invention.
Figure 6:
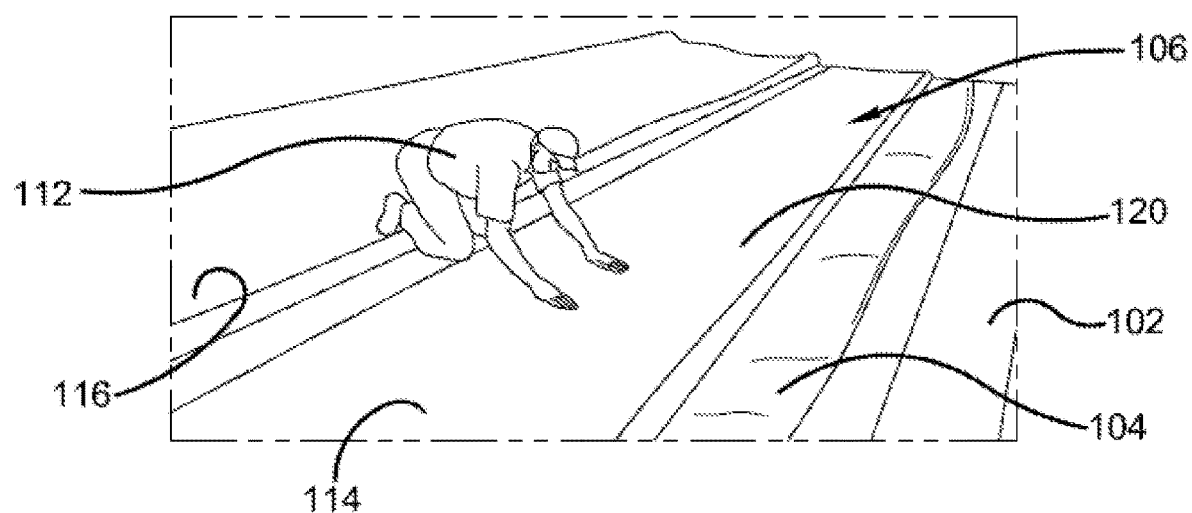
FIG. 6 is a picture showing aspects of one or more methods of the invention.
Figure 7:
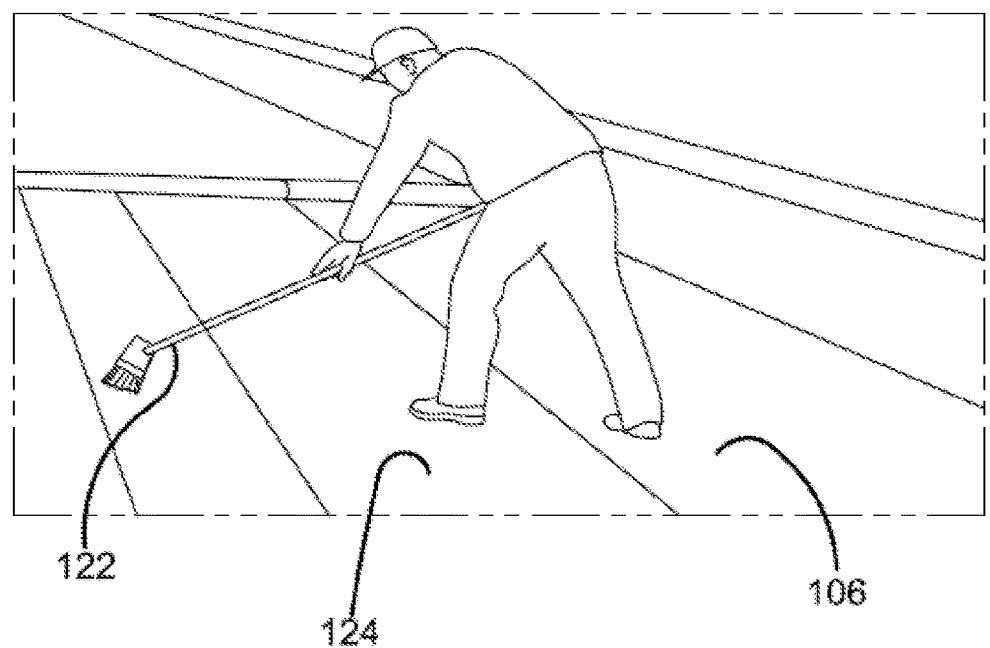
FIG. 7 is a picture showing aspect of one or more methods of the invention.

Methods for installation of the membranes can be understood with reference to the Figures. Specifically, with reference to FIG. 5, roof 100 is shown and includes roof substrate 102 with applied adhesive layer 104 and membranes 106 and 108 disposed thereon. As shown, membranes 106 and 108 are folded onto themselves across longitudinal fold line 110. With reference now to FIG. 6, membrane 106 is manipulated by installer 112 by sliding the upper portion 114 of the folded membrane by sliding it across the lower portion 116, which causes the bottom surface 120 of the membrane to be contacted with adhesive layer 104 on roof substrate 102. With reference now to FIG. 7, pressure is applied to the top surface 120 of membrane 106 by some form of mechanical manipulation to thereby enhance the contacting of the membrane to the adhesive layer. As shown, a broom 122 is applied across the top surface 124 of the membrane. Squeegees or rollers can also be used. Adjacent membranes are sealed to one another, which creates a water tight seal between membranes, by use of an adhesive or by thermal welding. For example, liquid adhesives or adhesive tapes may be used. Alternatively, mechanical welders may be employed.

The membranes of the present invention provide several advantages to the disclosed methods for installing the membrane. First, the ability to slide the folded membrane, as generally shown in FIG. 6, is facilitated by the reduction in the coefficient friction of the top surface of the membrane. Likewise, this reduced coefficient of friction facilitates the ability to manipulate the upper surface of the membrane for applying pressure such as generally shown in FIG. 7. Moreover, these advantages can be achieved without having a deleterious impact on other properties of the membrane. In particular, despite the threshold level of fatty acid amide present within the top layer of the membrane, adjacent membranes can be adequately mated and secured to each other along a lap seam to meet appropriate industry standards.

Fully-Adhered Roofing System

Figure 4:
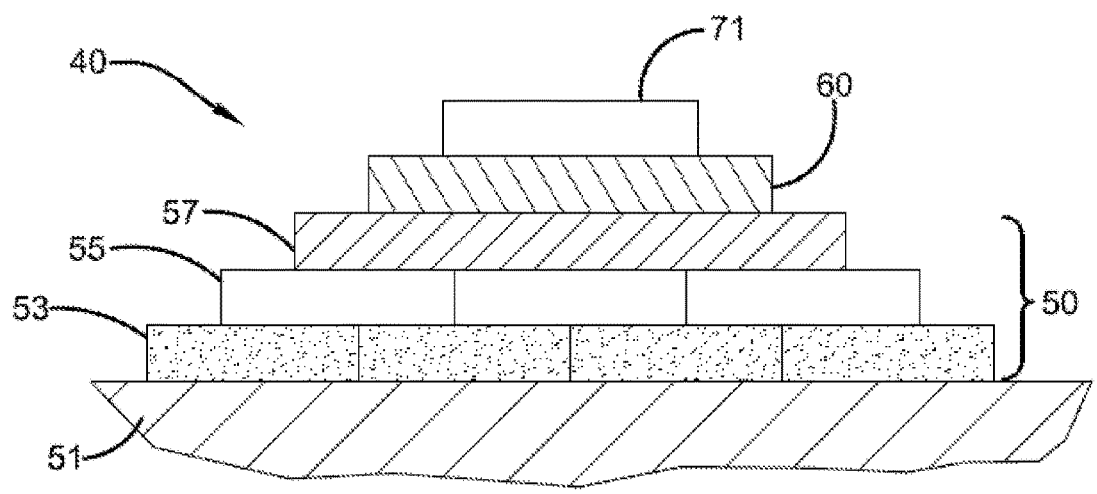
FIG. 4 is a cross-sectional view of a fully-adhered roofing system according to embodiments of the present invention.

The fully-adhered roofing systems of the present invention can be described with reference to FIG. 4. Roofing system 40 includes a roof deck 51, optional insulation layer 53, optional protection layer 55, optional existing membrane 57, adhesive layer 60, and membrane 71, where membrane 71 is a membrane according to one or more embodiments of the present invention. For purposes of this specification, the material to which the adhesive secures the membrane, which is the uppermost layer, can be referred to as the substrate. For example, where the membrane is adhesively secured to an insulation board or layer, the insulation board or layer may be referred to as a substrate.

Practice of this invention is not limited by the selection of any particular roof deck. Accordingly, the roofing systems herein can include a variety of roof decks. Exemplary roof decks include concrete pads, steel decks, wood beams, and foamed concrete decks.

In one or more embodiments, the existing membranes may include cured rubber systems such as EPDM membranes, thermoplastic polymers systems such as TPO membranes, or asphalt-based systems such as modified asphalt membranes and/or built roof systems.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which is incorporated herein by reference. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood.

In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510,25 which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

Practice of the present invention is also not necessarily limited by the adhesive employed to bond the membrane to the substrate. For example, the adhesive may include an adhesive that forms a bond through curing action such as is the case with a liquid bond adhesive (e.g., a butyl rubber adhesive) or a polyurethane adhesive. In other embodiments, the adhesive may be a pressure-sensitive adhesive, which may be applied to the membrane at the location where the membrane is manufactured (e.g., a factory-applied pressure-sensitive adhesive).

As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e., the substrate-contacting planar surface of the membrane) is adhered to the substrate through an adhesive.

Various modifications and alterations that do not depart from the scope and spirit of this invention will become apparent to those skilled in the art. This invention is not to be duly limited to the illustrative embodiments set forth herein.

What is claimed is:

1. A thermoplastic roofing membrane comprising:
    a first layer and second layer, which are laminated to one another with a reinforcing scrim disposed between the first and second laminated layers;
    wherein the first layer includes compositionally distinct coextruded layers;
    wherein a first coextruded layer of the membrane, which forms a planar surface of the membrane that is exposed to weather upon installation, includes an ethylene-based olefinic block copolymer and a fatty acid amide;
    wherein the other layers of the membrane are devoid of fatty acid amides;
    wherein the fatty acid amide is present at from about 0.20 wt % to about 2.0 wt % based upon the total weight of the top layer; and
    where the amount of fatty acid amide provides the planar surface with a coefficient of friction (ASTM D 1894) of less than 0.250.

2. The roofing membrane of claim 1, where the fatty acid amide is present at from about 0.3 wt % to about 1.8 wt % based upon the total weight of the first coextruded layer.

3. The roofing membrane of claim 1, where the fatty acid amide is present at greater than 0.10 pbw per 100 parts by weight of the polymeric content of the top layer.

4. The roofing membrane of claim 1, where the fatty acid amide is present at from about 0.20 pbw to about 1.0 pbw per 100 parts by weight of the polymeric content of the top layer.

5. The roofing membrane of claim 1, where the fatty acid amide is an unsaturated fatty acid amide.

6. The roofing membrane of claim 1, where the fatty acid amide is selected from the group consisting of myristoleamide, palmitoleamide, sapienamide, oleamide, elaidamide, vaccenamide, linoleamide, linoelaidamide, alpha-linolenamide, arachidonamide, eicosapentaenoamide, erucamide, and docosahexaenoamide.

7. The roofing membrane of claim 1, where the fatty acid amide is erucamide.

8. The roofing membrane of claim 1, where the fatty acid amide includes a double bond having a cis configuration.

9. The roofing membrane of claim 1, where the fatty acid amide has a molecular weight of greater than 250 g/mol.

10. The roofing membrane of claim 1, where the fatty acid amide has a molecular weight of from about 300 to about 750 g/mol.

11. A method of forming an adhered roof system, the method comprising:
    adhering the membrane of claim 1 to a roof substrate so that the layer including the ethylene-based olefinic block copolymer and a fatty acid amide is exposed to the environment upon installation.

12. The method of claim 11, where said method includes folding the membrane onto itself so that a second portion of the membrane is disposed on a first portion of the membrane with the top surface of the first portion contacting the top surface of the second portion.

13. The method of claim 12, further comprising the step of manipulating the second portion of the membrane to thereby slide the top surface of the second portion across the top surface of the first portion while adhering the membrane to the roof substrate.

14. The method of claim 11, further comprising the step of adhering a second membrane to the roof surface, where the second membrane is adjacent to the first membrane, and further comprising the step of mating the first and second membranes to each other along a lap edge.

\* \* \* \* \*